United States Patent [19]

Marttala

[11] 4,076,576
[45] Feb. 28, 1978

[54] METHOD AND APPARATUS FOR THE EVAPORATION OF LIQUIDS

[75] Inventor: Lauri Tapani Marttala, Varkaus, Finland

[73] Assignee: A. Ahlstrom Osakeyhtio, Finland

[21] Appl. No.: 644,714

[22] Filed: Dec. 29, 1975

[30] Foreign Application Priority Data
Jan. 20, 1975   Finland .................................. 750130

[51] Int. Cl.² .............................................. B01D 1/22
[52] U.S. Cl. .............................. 159/13 B; 159/17 R; 159/27 B; 159/47 WL
[58] Field of Search ............... 159/17 R, 17 VS, 17 P, 159/DIG. 22, 28 P, 46, 13 A, 13 B, 27 B, 48 L, 47 WL, DIG. 4

[56] References Cited
U.S. PATENT DOCUMENTS

| | | | |
|---|---|---|---|
| 1,200,996 | 10/1916 | Soderlund et al. ................. | 159/13 A |
| 3,322,648 | 5/1967 | Kays et al. .................... | 159/DIG. 22 |
| 3,351,120 | 11/1967 | Goeldner et al. ............ | 159/DIG. 22 |
| 3,469,616 | 9/1969 | Laguilharre ........................ | 159/17 R |

Primary Examiner—Norman Yudkoff
Attorney, Agent, or Firm—Bucknam and Archer

[57] ABSTRACT

Liquids which, when dilute, tend to froth during mixing or boiling are evaporated in an evaporator by feeding the entire liquid quantity to be evaporated into the evaporator, bringing only part of it in indirect heat exchange contact with a hot medium to concentrate the liquid, recycling part of the concentrated liquid to the heat exchange to prevent frothing of the liquid to be evaporated, and withdrawing the vaporized portion and the concentrated liquid from the evaporator.

13 Claims, 5 Drawing Figures

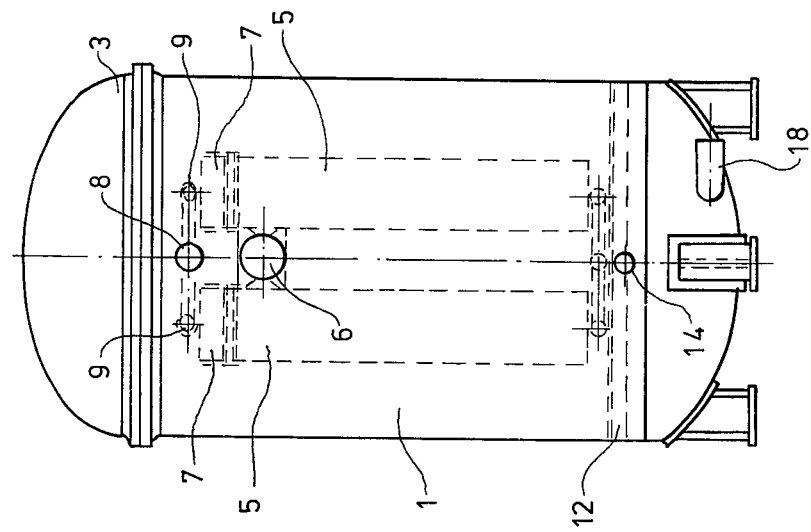
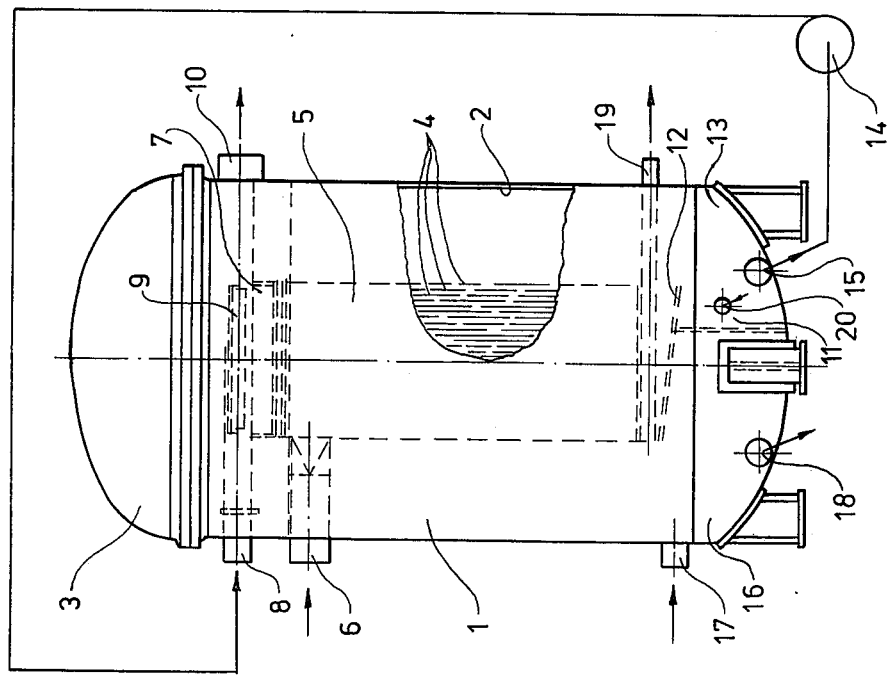

METHOD AND APPARATUS FOR THE EVAPORATION OF LIQUIDS

BACKGROUND OF THE INVENTION

The invention relates to a method for the evaporation of liquids, especially such liquids which tend to froth when mixed, and to an apparatus for carrying out the method.

The method according to the invention is mainly intended for the pre-evaporation of the waste liquid emerging from a continuous-working digester, such as sulfate black liquor, whereby the concentration of the black liquor is adjusted from approx. 15–18% to approx. 23–25% in film evaporation devices working according to the falling-film principle, using the so-called buffer vapor from the digestion for the evaporation.

In a currently used continuous-working cellulose digester the black liquor passing to the evaporation system is taken out at a pressure of approx. 8 atm (absolute) and at a temperature of approx. 170° C. Thus it contains a considerable amount of thermal energy, which can be exploited in the process.

So far the black liquor has usually first been pre-evaporated by lowering the pressure in two successive expansion stages so that a liquor vapor at approx. 120° C, suitable for the roasting of digestion chips, is obtained from the first stage and that the liquor vapor produced during the second stage is used for heating water. Thereby the liquor reaches a temperature of approx. 100° C, which is considered a suitable inlet temperature for evaporation. The final evaporation is performed in a multistage evaporator based on indirect heat exchange, wherein fresh vapor is fed to the first stage to yield the thermal energy required by the process. This use of heat is not as efficient as it could be.

If expansion vapor from the digester is used as the source of heat for the black liquor evaporation system, the requirement of fresh vapor is reduced. Environmental advantages are also gained.

The use of black liquor expansion vapor for the pre-evaporation is known per se and has been described in U.S. Pat. No. 3,286,763, for example. The object of the invention is to eliminate one problem involved in its application.

The concentration of the black liquor emerging from the digester is usually approx. 15%. If the concentration is less than 20%, the liquor froths easily when mixed or boiled. In evaporation systems based on indirect heat exchange this causes soilage of the heat exchange surfaces and blockage of the flow conduits. In order to eliminate this problem, concentrated liquor from later stages has usually been mixed with the dilute liquor fed to the first stage of the multi-stage evaporator, in a ratio to raise the concentration of the latter to over 20%. This method cannot be used, without worsening the heat economy, in an evaporation system wherein expansion vapor from the digester is used as a source of heat.

From U.S. Pat. No. 2,786,518, for example, a sulfite waste liquor evaporation apparatus is known wherein sulfite waste liquor is brought into an indirect heat exchange contact with a hot medium in a heat exchanger in order to concentrate the waste liquor by evaporation. In this apparatus, part of the concentrated waste liquor is returned and combined with the dilute waste liquor to be evaporated, in order to increase the concentration of the latter before the indirect heat exchange contact. The object of increasing the concentration is to reduce carbon formation on the heat exchange surfaces, which appears when dilute waste liquor is heated.

Such an apparatus is disadvantageous in terms of heat economy because waste liquor flows which are at different temperatures are combined, i.e., a hot return flow is combined with a cooler flow of the waste liquor to be evaporated. In this apparatus the entire liquor quantity to be evaporated is exposed to an indirect heat exchange contact, together with the return liquor.

The object of the invention, on the other hand, is to eliminate the frothing problem without worsening the heat economy. It is especially applicable to black-liquor evaporation systems wherein the pre-evaporation of the liquor is performed in falling-film evaporators, whose working principle has been described in, for example, U.S. Pat. No. 3,366,158.

Thus the object of the present invention is to provide a method and apparatus for the evaporation of liquids, especially liquids which, when dilute, tend to froth during mixing, wherein the liquid to be evaporated is fed into an evaporation zone wherein it is brought into an indirect heat exchange contact with a hot medium in order to concentrate the liquid, and the vaporized portion and concentrated liquid are removed from the evaporation zone.

SUMMARY OF THE INVENTION

The black liquor is prevented from frothing by maintaining high enough the concentration of the liquor fed onto the surfaces of the heat exchanger of the evaporator. This is achieved by incorporating the heat exchanger into a recycling system in which part of the dilute liquor emerging from the digester is added continuously and wherefrom concentrated liquor is removed continuously. This is achieved, without adversely affecting the heat economy, by feeding the entire liquid quantity to be evaporated into the evaporation space, wherein, however, only part of the liquid is brought into an indirect heat exchange contact with the hot medium.

DESCRIPTION OF THE DRAWINGS

FIGS. 1 and 2 show side and front views of an evaporation unit according to the invention.

DESCRIPTION OF THE PREFERRED EMBODIMENTS

Figure 3A:
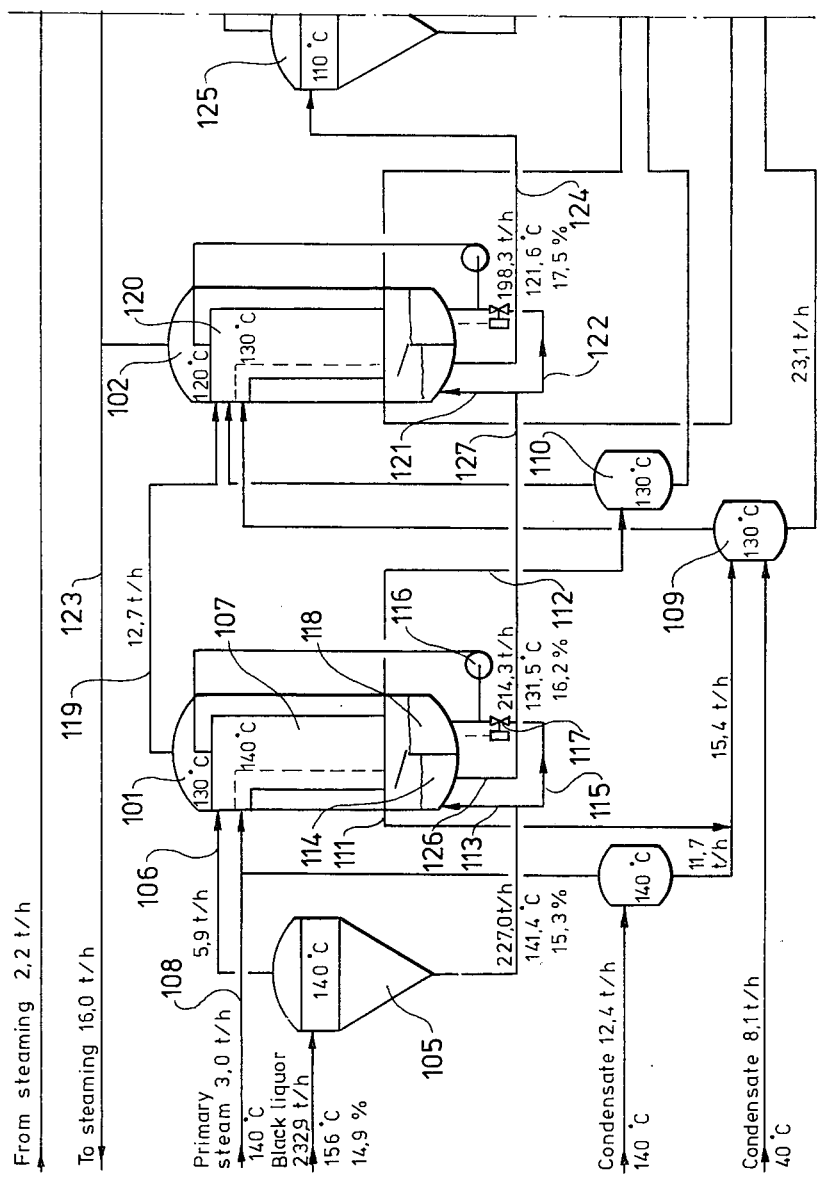
FIGS. 3a–b show a schematic side view of an evaporation system which comprises evaporation units according to FIGS. 1 and 2.

According to a preferred embodiment of the invention, part of the liquid to be evaporated is caused to evaporate by heating it indirectly, while the other part of it is expansion evaporated. The two evaporations are performed in one and the same evaporation space in separate liquid compartments with a common gas space, in which case that part of the liquid concentrated by heating which is not returned to the indirect heat exchange contact is combined with the liquid portion to be expansion evaporated, before the concentrated liquid is removed from the evaporation space. The combination can naturally also be performed outside the evaporation space.

The invention also relates to an evaporator which is a combined expansion tank and heat exchanger and helps to provide for liquids a considerably simpler and less expensive evaporation apparatus, easier to control. Thus, it has been possible to replace all the connecting pipes between the expansion tank and the evaporator by a partition, and there is a common outlet pipe for the vapor.

In FIGS. 1 and 2 the cylindrical part of the evaporation unit is indicated by 2 and its cover, which can be opened, by 3. Laminae 4, serving as a heat exchanger, combined into groups 5, have been suspended in the cylindrical chamber. Heating vapor is fed inside the laminae through the pipe 6. Above the lamina groups there is a division box 7, into which the liquid to be evaporated is fed through the pipe 8 and the perforated distribution pipes 9. Through the perforations at the bottom of the division box the liquid flows evenly according to the falling-film principle onto the outer surfaces of the laminae, where it is heated and boils. The liquid flows downwards along the thermal surfaces and the concentrated solution is collected in the lower section of the evaporator. The produced evaporate flows out through the pipe 10 in the upper section of the evaporator.

The lower section of the evaporator has been divided into two compartments by means of a partition 11. By means of a guiding plate 12 the solution flowing from the laminae is directed into one compartment 13, wherefrom it is returned, through the pipes 15 and 8, onto the outer surfaces of the laminae 4 by means of a pump 14. Pressurized hot solution is fed through the pipe 17 into the other compartment 16 of the lower section of the evaporator, and having yielded expansion vapor it flows out through the pipe 18 in the bottom part of the lower section. The condensate is removed through the pipe 19 at the lower section of the heat exchanger.

Since liquid continuously evaporates from the solution which circulates from the lower section of the evaporator onto the heat exchange surfaces, new solution must be added to the cycle. This solution is directed to the lower section of the evaporator through the pipe 20. The quantity of the solution to be added is adjusted so as to maintain at the desired level the concentration of the solution fed onto the thermal surfaces. When evaporating the black liquor from a cellulose digester, the concentration of the liquor must be approx. 20% at minimum in order to eliminate frothing. Excess solution flows over the partition 11 into the compartment 16; the liquid level in this compartment can be maintained constant by means of a regulator.

Figure 3B:
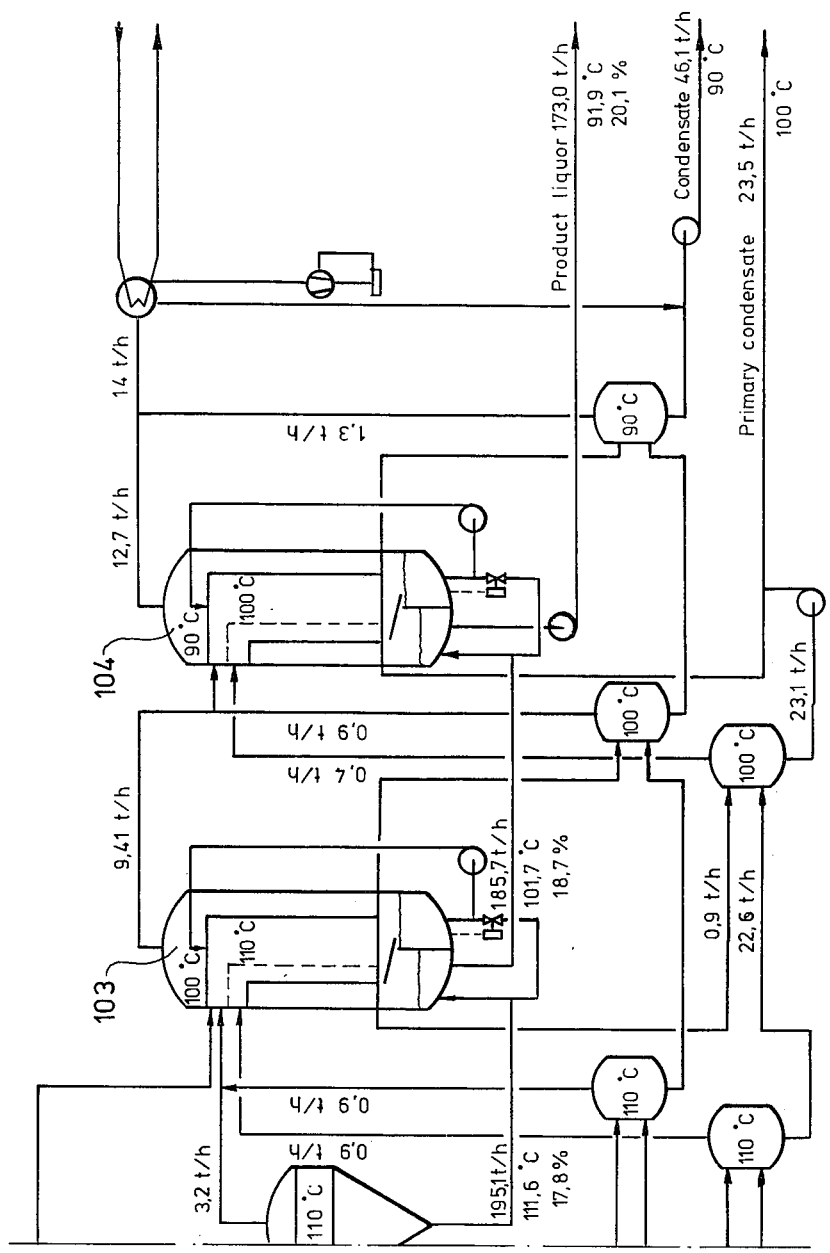

FIGS. 3a–b depict, as an example, a buffer-vapor evaporation system, wherein the black liquor emerging from a digester is pre-evaporated using the method and apparatus according to the invention.

The evaporation units according to the invention are indicated in the figures by 101, 102, 103 and 104. Number 105 indicates the expansion tank wherein the pressure of the dilute liquor from the digester is lowered to produce expansion vapor having a temperature of 140° C. The expansion vapor is directed through the pipe 106 into the evaporator 101 and used as heating vapor in its heat exchanger 107. The spaces for the liquor vapor and the fresh vapor in the heat exchanger have been separated and the condensates from the heat exchanger are fed into two separate expansion tanks 109 and 110 through the pipes 111 and 112.

From the expansion tank 105, black liquor is directed through the pipe 113 into the expansion space 114 in the evaporator, wherefrom the liquor is removed through the pipe 126 after yielding expansion vapor. Line 126 performs the same function as line 18 in FIG. 1. Part of the liquor emerging from the expansion tank 105 is directed through the pipe 115 and mixed with the solution which is caused to flow onto the heat exchange surfaces and circulated by means of the pump 116. The concentration of the liquor to be circulated is adjusted at approx. 20% by means of the regulator 117. From the cycled-liquor space 118 it flows into the expansion space 114, wherein the liquid level is adjusted in a manner known per se (not shown).

The expansion vapor and the evaporation vapor flow out of the upper section of the evaporator 101 through the pipe 119 and are directed into the next evaporator 102, wherein they are used as heating vapor for the heat exchanger 120. Expansion vapor from the condensate tanks 109 and 110 is also fed into the heat exchanger.

The liquor from the evaporator 101 is fed through the pipes 126, 127 and 121 into the expansion space in the evaporator 102 and through the pipe 122 into the liquor cycle.

From the evaporator 102 the vapor is directed through the pipe 123 and used for the roasting of the digester chips and the liquor is fed through the pipe 124 into the expansion tank 125, wherefrom heating vapor is obtained for the following evaporation stage.

After the last evaporation unit 104 the liquor is treated in a conventional series-evaporation plant. As an example, in the system depicted in FIG. 3 the portion of the liquor passing to the heat exchanger of the evaporator is 19% in the evaporator 101, 54% in the evaporator 102, 59% in the evaporator 103 and 100% in the evaporator 104, calculated from the total amount of liquor.

In the embodiment illustrated by the example, two evaporation units have been used after the two expansion tanks 105 and 125, but it is clear that their number can be smaller or greater.

Figure 4:
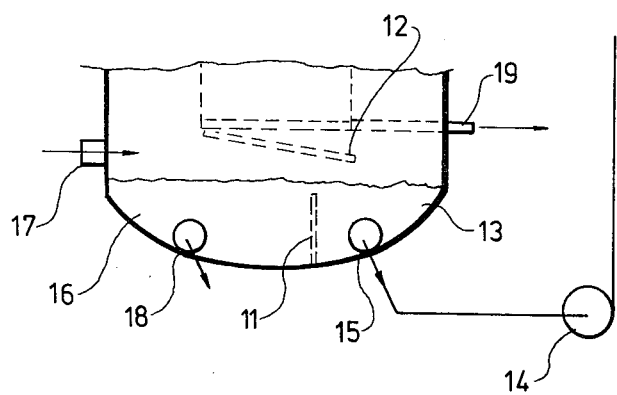
FIG. 4 shows a partial view of an alternative embodiment of the invention.

The evaporator according to FIG. 4 deviates from the evaporator in FIGS. 1 and 2 in that the pipe 20 for feeding the liquid to be evaporated into the first liquid space 13 has been eliminated and replaced by maintaining the liquid level in the evaporator slightly above the upper edge of the partition 11 so that the liquid can flow from the first liquid space 13 into the second one 16 and back. In this manner the construction of the evaporator can be made simpler than it was previously.

The construction of the evaporator can also be changed by, for example, eliminating the guiding plate 12, in which case part of the concentrated solution flows into the expansion space 16 and part of it into the circulating-liquid space 13.

The evaporation system can also comprise several evaporation units placed one on top of the other and forming a tower structure, in which case the solution to be evaporated is first directed into the topmost unit and therefrom into those below it.

What is claimed is:
1. An apparatus for evaporating liquids which, when dilute, tend to froth during mixing or boiling, the apparatus having an evaporation chamber and in the chamber: a heat exchanger and means for causing the liquid to be evaporated to flow along the heat exchange surfaces of the heat exchanger in order to boil and concentrate the liquid, a feed inlet for feeding into the chamber the liquid to be evaporated, an outlet, in the lower part of the chamber, for removing the concentrated liquid, and an outlet, in the upper part, for removing the vapor from the chamber; and means for recirculating onto the heat exchange surfaces of the heat exchanger the concentrated liquid from the heat exchanger accumulated in the lower part of the chamber, and a member which divides the lower part of the evaporation chamber into two liquid compartments having a joint vapor space, said means for recirculating the concentrated liquid having the inlet connected to the first liquid compartment and to the feed inlet for the liquid to be expansion evaporated and the outlet for concentrated liquid having been connected to the second liquid compartment.

2. An apparatus according to claim 1, comprising a distribution device which is located above the heat exchanger and connected to the outlet of the recirculating means in order to cause the liquid to flow onto the heat exchange surfaces of the heat exchanger, the heat exchanger being supported above the liquid at the bottom of the chamber.

3. An apparatus according to claim 1, comprising a control device connected to said recirculating means in order to control the amount of the liquid to be added to the portion concentrated by heat exchange prior to recycling.

4. An apparatus according to claim 1 comprising means for connecting the two liquid compartments whereby the liquid which has been concentrated by indirect heat exchange collects in the first compartment, the inlet for the liquid to be evaporated is in the second liquid compartment and part of the concentrated liquid flows from the first to the second liquid compartment.

5. An apparatus according to claim 4, wherein said member which divides the lower part of the evaporation chamber into two liquid compartments is a partition which is located at the bottom of the evaporation chamber and which allows a flow of liquid between the liquid compartments over the partition.

6. An apparatus according claim 4, in which the partition is located below the heat exchanger so that at least part of the liquid concentrated by indirect heat exchange which flows downwardly flows into the first liquid compartment.

7. An apparatus according to claim 4, wherein a guiding surface is located between the heat exchanger and the partition in order to direct the liquid concentrated by indirect heat exchange into the first liquid compartment.

8. A method of concentrating a liquid which when dilute would have a tendency to froth which comprises introducing the liquid into an evaporation zone, concentrating the liquid by expansion, simultaneously bringing a portion of the liquid in indirect heat exchange contact with a hot medium and concentrating said portion by indirect heat exchange, recycling part of the solution concentrated by indirect heat exchange to said indirect heat exchange zone, mixing the remainder of said concentrated solution with the liquid to be concentrated only by expansion, concentrating the combined portion by subjecting said combined portion to expansion evaporation and separately removing the vapor and the condensate liquid.

9. A method according to claim 8 wherein the liquid to be concentrated is sulfate black liquor obtained from the digestion of cellulose and the liquid to be evaporated is added to the liquid concentrated by indirect heat exchange in such an amount that the liquid to be recycled to the indirect heat exchange zone is at a minimum of 20% concentration.

10. The method according to claim 8 wherein the hot medium in the indirect heat exchange zone is the vapor removed from the expansion zone.

11. The process according to claim 8 wherein the concentrate removed from the evaporation zone after one stage is subjected to subsequent stages and at each stage only part of the liquid is subjected to indirect heat exchange, the entire liquid is evaporated by expansion, part of the liquid concentrated by indirect heat exchange is recycled to the indirect heat exchange zone and the remainder is combined with the liquid which is to be evaporated by expansion and the concentration of the liquid subjected to indirect heat exchange is at a minimum of 20%.

12. The process according to claim 11 wherein the portion of liquid subjected to indirect heat exchange is 19% in the first stage, 54% in the second stage, 59% in the third stage and 100% in the fourth stage.

13. A method according to claim 8, wherein in order to heat, by an indirect heat exchange contact, the liquid to be evaporated, the liquid is distributed evenly onto hot heat exchange surfaces and caused to flow substantially downwards along the heat exchange surfaces, whereafter concentrated liquid is recovered and part of it is recycled for distribution onto the heat exchange surfaces, together with the more dilute liquid to be evaporated.

* * * * *